United States Patent
Stoll et al.

(10) Patent No.: US 8,162,582 B2
(45) Date of Patent: Apr. 24, 2012

(54) THREADED CONNECTION PIECE

(75) Inventors: Oliver Stoll, Reutlingen (DE); Christian Roesser, Grossbottwar (DE); Markus Ledermann, Salach (DE); Joerg Engelhardt, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/736,640

(22) PCT Filed: Mar. 12, 2009

(86) PCT No.: PCT/EP2009/052927
§ 371 (c)(1),
(2), (4) Date: Feb. 8, 2011

(87) PCT Pub. No.: WO2009/132886
PCT Pub. Date: Nov. 5, 2009

(65) Prior Publication Data
US 2011/0123261 A1    May 26, 2011

(30) Foreign Application Priority Data
Apr. 30, 2008  (DE) .......................... 10 2008 001 523

(51) Int. Cl.
*F16B 33/00*  (2006.01)
(52) U.S. Cl. ............................. 411/369; 73/756; 285/4
(58) Field of Classification Search .................. 411/369, 411/392, 424; 285/4, 80, 107, 332, 332.1, 285/285, 343; 374/208; 73/756
See application file for complete search history.

(56) References Cited

U.S. PATENT DOCUMENTS

| | | | | |
|---|---|---|---|---|
| 2,450,170 A | * | 9/1948 | Smith | 285/340 |
| 2,755,110 A | * | 7/1956 | Jacobs | 285/331 |
| 2,768,845 A | * | 10/1956 | Samiran | 285/331 |
| 3,195,933 A | * | 7/1965 | Jacobs | 285/247 |
| 3,684,322 A | * | 8/1972 | Kotsakis | 285/343 |
| 3,895,832 A | * | 7/1975 | Ellis et al. | 285/322 |
| 4,022,497 A | * | 5/1977 | Kotsakis | 285/4 |
| 4,256,334 A | * | 3/1981 | Boisset et al. | 285/247 |
| 5,212,989 A | * | 5/1993 | Kodama et al. | 73/706 |
| 6,035,722 A | * | 3/2000 | Giersch et al. | 73/714 |
| 6,105,434 A | * | 8/2000 | Engeler | 73/702 |
| 6,746,150 B2 | * | 6/2004 | Wienand et al. | 374/208 |
| 7,393,018 B2 | * | 7/2008 | Williams | 285/249 |

FOREIGN PATENT DOCUMENTS

| | | |
|---|---|---|
| DE | 10 2006 043 324 | 3/2008 |
| EP | 1 770 377 | 4/2007 |
| WO | WO 2007/119323 | 10/2007 |
| WO | WO 2008/031691 | 3/2008 |

* cited by examiner

*Primary Examiner* — Gary Estremsky
(74) *Attorney, Agent, or Firm* — Kenyon & Kenyon LLP

(57) ABSTRACT

A threaded connection piece, e.g., a connection piece of a sensor, includes a cylindrical base body that is able to be at least partially introduced into an accommodating opening, which is provided, at least over a part of its longitudinal extension, with a threaded section and, at its end face, with a sealing surface. In order to improve the sealing properties of the threaded connection piece when it is screwed into the accommodating opening, the cylindrical base body is developed to be elastic between the threaded section and the sealing surface.

8 Claims, 2 Drawing Sheets

THREADED CONNECTION PIECE

BACKGROUND OF THE INVENTION

1. Field of the Invention

The present invention relates to a threaded connection piece, for a sensor.

2. Description of Related Art

A sensor for the combined measurement of pressure and temperature is known from published German patent application document DE 10 2006 043 324 A1, which has a threaded connection piece that is able to be screwed into an accommodating opening of a component, such as an accommodating opening in a fluid line of an air conditioning system. For this purpose, the threaded connection piece has a cylindrical base element, that is able to be introduced at least partially into the accommodating opening, and that is provided with a threaded section. When the threaded connection piece is screwed into the accommodating opening, that is provided with an inner thread, the base element comes into contact with a sealing surface, that is developed in the form of an end-face sealing cone, at a shoulder developed in the accommodating opening, while developing a sealing seat, whereby the accommodating opening is sealed. The threaded connection piece may be produced, for instance, using a metal injection molding method, as an MIM component (metal injection molding), or also as a turned part, or in another form.

Such threaded connection pieces are installed in air conditioning systems of motor vehicles, for example, for combined pressure and temperature sensors. In the case of $CO_2$ air conditioning systems, there are very high requirements on sealing. Thus, the leakage may not be greater than 1 g of $CO_2$ per annum. The threaded connection piece has to be able to be screwed into the accommodating opening repeatedly, without loss of sealing effectiveness, and is screwed into a relatively soft component made of aluminum using a relatively small screw-in torque of about 10 Nm. The media temperatures, that occur during the operation of the air conditioning system, of −40° C. to 180°, condition great differences in the longitudinal extension of the threaded connection piece and the accommodating opening, whereby the sealing effect may be reduced. In an unfavorable case, the connection between the threaded connection piece and the accommodating opening becomes leaky. As the distance between the threaded section of the threaded connection piece and the sealing cone of the threaded connection piece becomes greater, the danger of leakiness increases.

BRIEF SUMMARY OF THE INVENTION

The threaded connection piece according to the present invention has a cylindrical base element that is furnished with a threaded section. Between the threaded section and an end face-located sealing surface, the base element is advantageously developed to be elastic, so that the base element is able to deform elastically at this location, already at small screwing-in torques, and is able to adapt itself to the counter-contour in the accommodating opening. Using the threaded connection piece according to the present invention, the differences occurring, in response to temperature fluctuations, in the longitudinal extension of the threaded connection piece and the accommodating opening are able to be compensated for. In addition, because of the elastic development of the threaded connection piece, an equalization of geometric tolerances is possible, which increases the sealing effect. Because of the elastic development of the threaded connection piece, even in response to multiple screwing in and out of the threaded connection piece, a reliable sealing effect may be achieved, since the sealing surface is acted upon by the elastic tensional force of the threaded connection piece when it is screwed in against the counterseat in the accommodating opening.

It is proposed to develop the cylindrical base element to be elastic between the threaded section and the sealing surface, by a reduction in its wall thickness. In order to reduce the wall thickness, one may at least provide a material channel in the outer jacket of the base element. At its outer jacket, the cylindrical base element may be provided, for example, with material channels between the threaded section and the sealing surface, in the form of recesses that are arranged distributed over the circumference, which are separated from one another by crosspieces. Such a threaded connection piece may, for instance, be produced as an MIM component.

One example embodiment is especially advantageous, in which the cylindrical base element is provided at its outer jacket with an encircling groove that forms the at least one material channel between the threaded section and the sealing surface. The groove may be inserted into the threaded connection piece during the production of the threaded connection piece as an injection molded part as well as during its production as a turned part. The closer the groove is to the sealing surface, the better is the elastic effect, and the better the sealing surface is able to adapt to the counterpiece. By the special selection of the position of the groove between the sealing surface and the threaded section, and by the formation of the depth of the groove, the elasticity of the base element may be adapted specifically to the requirements. Thereby, the elasticity may be set to an intermediate value, as a compromise between the required elasticity on the one hand, and the required resistance to breaking off of the threaded connection piece at high rotating torques on the other hand.

DETAILED DESCRIPTION OF THE INVENTION

Figure 1:
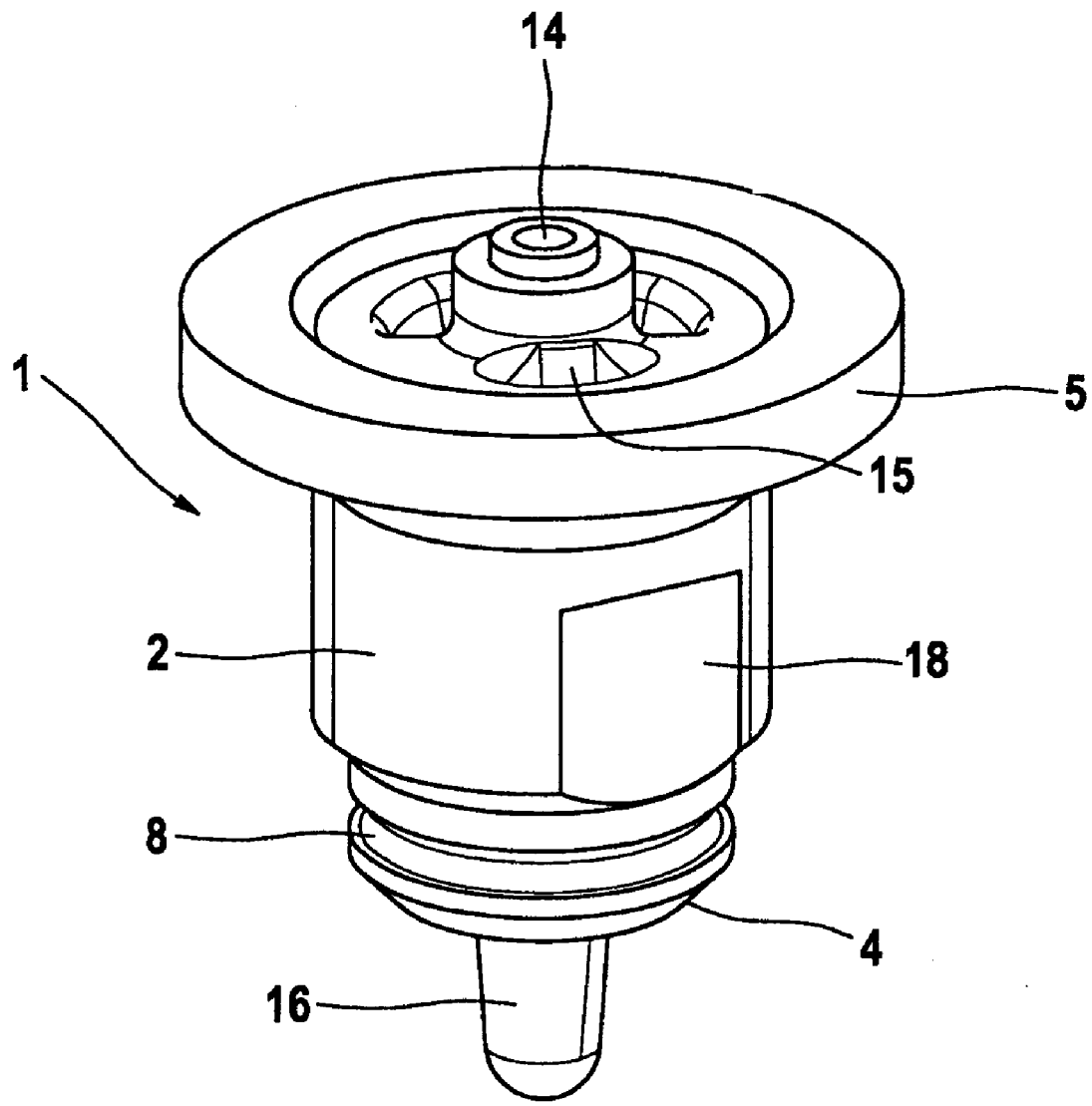
FIG. 1 shows a perspective view of a part of a combined pressure and temperature sensor having the threaded connection piece according to the present invention.

FIG. 1 shows a part of a combined pressure and temperature sensor. The part represented includes a base part having a flange 5 and a threaded connection piece 1 projecting from it. a cover part (not shown) may be placed on the base part. The inner design of such a sensor has been described in detail in published German patent application document DE 10 2006 043 324 A1, for example. As may be seen in FIG. 1, the sensor includes an accommodation for a pressure sensor element 14 and a temperature sensor bore 15, through which a temperature sensor may be pushed into threaded connection piece 1 in such a way that a temperature sensor element is introduced into a finger 16 that projects away from threaded connection piece 1 at its extremity.

Figure 2:
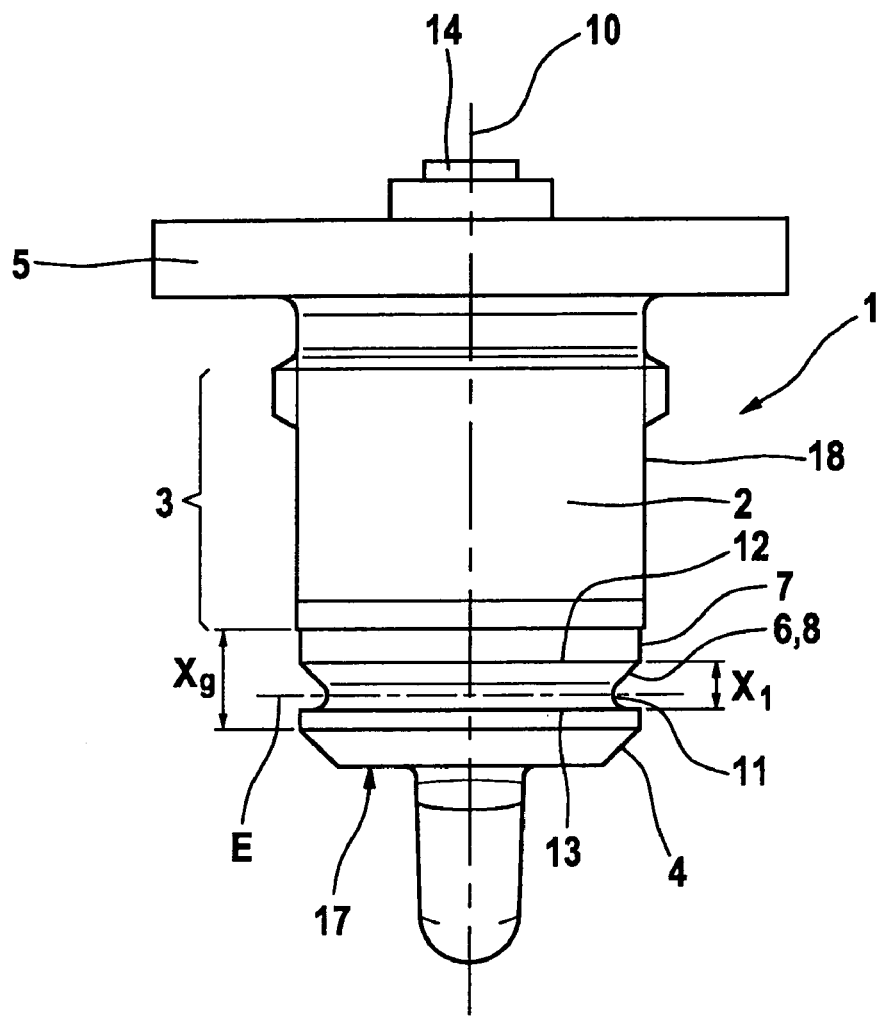
FIG. 2 shows a longitudinal section through FIG. 1.

As is shown in FIGS. 1 and 2, threaded connection piece 1 has a cylindrical base body 2, projecting away from flange 5, that has a longitudinal axis 10, whose outer jacket 7 is provided with a threaded section 3 and which is provided at its end face 17 with a sealing surface 4. Sealing surface 4 is preferably developed as a sealing cone. Cylindrical outer jacket 7 of base body 2 may be provided with flattened regions 18. Base body 2 may be provided at an inner area with a pressure supply opening (not shown), which extends from end face 17 of threaded connection piece 1 up to the accommodation of pressure sensor element 14. Temperature sensor bore 15 also runs through the threaded connection piece. The threaded connection piece is able to be screwed, end face 17 first, into an accommodating opening of a line, equipped with an inner thread, so that sealing surface 4 comes into contact at a countersurface in the accommodating bore while developing a sealing seat.

Cylindrical base body 2 is developed to be elastic between threaded section 3 and sealing surface 4, according to the present invention. This may be achieved by a reduction in the wall thickness of base body 2, for example. For this purpose, preferably at least one material channel 6 is provided in outer jacket 7 of base body 2. It is possible, for instance, to provide base body 2 with recesses situated in distributed fashion around the circumference, which are separated from one another by crosspieces. Such a threaded connection piece could be produced as a MIM component, for example. In the preferred exemplary embodiment shown in FIGS. 1 and 2, material channel 6 is developed as an encircling groove 8. This groove is situated between sealing surface 4 and threaded section 3.

Figure 3:
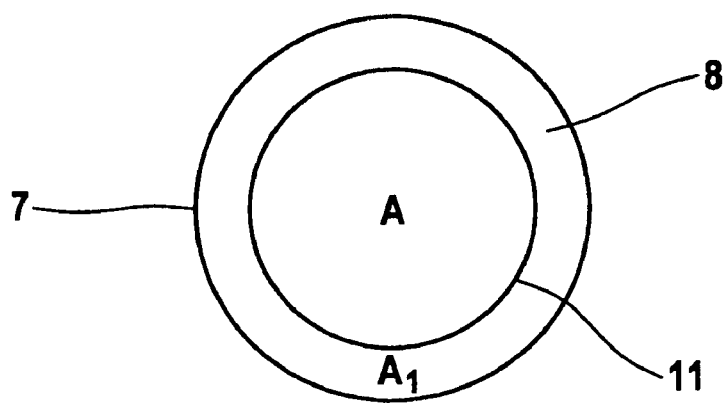
FIG. 3 shows a basic diagram to explain the area ratios in FIG. 2.

In order to develop the required elasticity, encircling groove 8 has an annular area expanse A1 in a plane E running perpendicular to longitudinal axis 10 of base body 2 through base of groove 11, between base of groove 11 and outer jacket 7 of base body 2, which annular area expanse A1 forms a ratio to cross sectional area A of base body 2 in plane E that is greater than 0.05 and less than 0.8. Cross sectional area A of base body 2 is to be regarded, in this connection, as the circular area 11 bordered by circular base of groove 11, independent of openings and channels in base body 2. Area expanse A1 of encircling groove 8 and cross sectional area A are shown in FIG. 3. Furthermore, it is advantageous for the development of the required elasticity if two groove edges 12, 13 that border on encircling groove 8 at outer jacket 7 of base body 2 are at a distance apart $X_1$ that defines the width of the groove, which forms a ratio to distance $X_g$ of the sealing seat from threaded section 3 that is greater than 0.05.

The closer encircling groove 8 is placed to sealing surface 4, the better is the elastic effect, and the better is surface 4, developed as a sealing cone, able to adapt to the counterpiece.

The threaded connection piece, according to the present invention, is not limited to the use in the pressure and temperature sensor shown, and may basically be used for all components which are to be fixed in an accommodating opening using a threaded connection piece, while developing a sealing effect.

What is claimed is:

1. A threaded connection piece for a sensor, the connection piece configured to be screwed into an accommodating opening, comprising:
a cylindrical base body configured to be at least partially introduced into the accommodating opening, wherein the cylindrical base body has: (i) a threaded section over at least a part of the longitudinal extension of the cylindrical base body, and (ii) a sealing surface at one end face, and wherein the cylindrical base body is configured to be elastic between the threaded section and the sealing surface;
wherein the cylindrical base body is configured to be elastic between the threaded section and the sealing surface by a reduction in the wall thickness of the cylindrical base body;
wherein at least one material channel is provided in an outer jacket of the base body for the reduction in the wall thickness;
wherein an encircling groove forming the at least one material channel is provided at the outer jacket of the cylindrical base body, between the threaded section and the sealing surface;
wherein the encircling groove has an annular area expanse in a plane extending perpendicular to the longitudinal axis of the base body and through the groove base of the groove, between the groove base and the outer jacket of the base body, wherein the ratio of the annular area expanse to the cross sectional area of the base body in the plane extending perpendicular to the longitudinal axis being greater than 0.05 and less than 0.8.

2. The threaded connection piece as recited in claim 1, wherein multiple material channels in the form of recesses distributed over the circumference are provided at the outer jacket of the cylindrical base body, between the threaded section and the sealing surface.

3. The threaded connection piece as recited in claim 1, wherein the sealing surface is formed by a sealing cone.

4. The threaded connection piece as recited in claim 1, wherein the threaded connection piece is a component of at least one of a pressure sensor and a temperature sensor.

5. A threaded connection piece for a sensor, the connection piece configured to be screwed into an accommodating opening, comprising:
a cylindrical base body configured to be at least partially introduced into the accommodating opening, wherein the cylindrical base body has: (i) a threaded section over at least a part of the longitudinal extension of the cylindrical base body, and (ii) a sealing surface at one end face, and wherein the cylindrical base body is configured to be elastic between the threaded section and the sealing surface;
wherein the cylindrical base body is configured to be elastic between the threaded section and the sealing surface by a reduction in the wall thickness of the cylindrical base body;
wherein at least one material channel is provided in an outer jacket of the base body for the reduction in the wall thickness;
wherein an encircling groove forming the at least one material channel is provided at the outer jacket of the cylindrical base body, between the threaded section and the sealing surface;
wherein two groove edges bordering on the encircling groove on the outer jacket of the base body are at a first distance from each other, wherein the first distance forms a ratio to a second distance of the sealing seat from the threaded section, the ratio being greater than 0.05.

6. The threaded connection piece as recited in claim 5, wherein multiple material channels in the form of recesses distributed over the circumference are provided at the outer jacket of the cylindrical base body, between the threaded section and the sealing surface.

7. The threaded connection piece as recited in claim 5, wherein the sealing surface is formed by a sealing cone.

8. The threaded connection piece as recited in claim 5, wherein the threaded connection piece is a component of at least one of a pressure sensor and a temperature sensor.

* * * * *